Sept. 11, 1962  W. S. SIMMIE ET AL  3,053,974
RESISTANCE WELDING
Filed Dec. 30, 1960
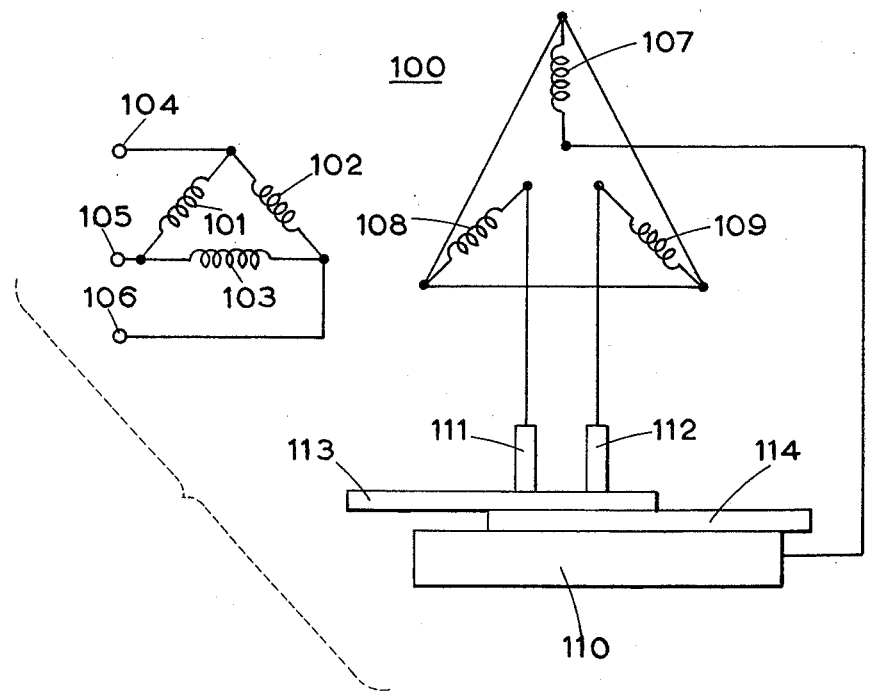
INVENTORS
WALTER STEWART SIMMIE
DENIS ASHLEY BYWATER
DONALD ROBINSON
BY  Karl L. Schiff
Their AGENT United States Patent Office 3,053,974
Patented Sept. 11, 1962

3,053,974
RESISTANCE WELDING
Walter Stewart Simmie, Headington, Denis Ashley Bywater, North Hinksey, and Donald Robinson, Watlington, England, assignors to Pressed Steel Company Limited, Oxford, England, a British company
Filed Dec. 30, 1960, Ser. No. 79,675
Claims priority, application Great Britain Jan. 5, 1960
4 Claims. (Cl. 219—116)

The present invention relates to resistance welding.

In the provisional specification accompanying our co-pending patent application No. 9,475/59 there is described a polyphase method of effecting series, multiple, welds. Two workpieces are arranged in overlapping relation and a group of welding electrodes is brought into contact with one of the workpieces and connected to the secondary windings of a polyphase transformer. These windings are short-circuited to one another through the workpieces to effect welding.

It is an object of the present invention to provide an improved method of effecting multiple welds in which both series and direct welding takes place.

According to the present invention a method of effecting multiple welds comprises the steps of arranging two workpieces in overlapping relation, on a back-up bar of high electrical conductivity, bringing at least two electrodes into contact with the workpiece remote from the back-up bar at a welding position, and completing a polyphase supply circuit to the electrodes and the back-up bar from the secondary winding of a polyphase transformer or transformers in such a manner that the secondary windings are short-circuited to one another through the workpieces and the back-up bar.

In carrying the invention into effect we may proceed somewhat as follows:

Apparatus for use in making multiple welds comprises a main framework carrying a copper back-up bar. Spaced from the back-up bar and arranged in line with the back-up bar are two welding electrodes with their associated pneumatic apparatus for applying welding pressure.

A three-phase transformer has its primary windings connected in mesh. The secondary windings have their outers short-circuited to one another and their inners connected to the two welding electrodes, and the back-up bar respectively. When two members of, say, sheet steel are to be welded to one another they are placed in overlapping relation with the overlap lying between the back-up bar and the welding electrodes, welding pressure is applied to the electrodes and the current is switched on by a contactor for a period suitable to effect welding.

The secondary windings are connected in star and the circuit is completed through the workpieces and the back-up bar.

The invention will now be described by way of example with reference to the accompanying drawing which is a schematic diagram of a welding apparatus.

In the drawing a three phase welding transformer 100 has its three primary windings 101, 102 and 103 connected in mesh and supplied with three phase A.C. from supply terminals 104, 105 and 106.

The three secondary windings 107, 108 and 109 arranged in star have their outers short circuited to one another as shown. The inner terminal of the winding 107 is connected to a copper back-up bar 110, the inner terminal of the winding 108 to a welding electrode 111 and the inner terminal of the winding 109 to a welding electrode 112.

Lying on the copper back-up bar 110 are two workpieces of sheet steel 113 and 114 with an overlapping region in the welding position.

Conventional pneumatic apparatus (not shown) is provided to supply welding pressure to the electrodes 111 and 112 and the current is switched on by a contactor under the control of a timing device for a period suitable to effect welding.

It will be seen that the star connection is completed through the workpieces and the back up bar and a short circuit current flows.

In this method the welding is effected partly by series welding and partly by direct welding. For example if the two electrodes are referred to as phases A and B and the back-up bar as phase C, when phase A is at zero current the current flow is entirely between phases B and C which gives direct welding. When phase C is at zero current the current flow is entirely between the two electrodes giving series welding. At some phase angles the welding currents flow between the electrodes themselves and between the electrodes and the back-up bar giving both series and direct welding.

It can be shown that over one complete cycle of the A.C. supply during 120° solely direct welding occurs and throughout the remaining 240° a mixture of series and direct welding is taking place.

The welds formed by this method have been found to be comparable with welds formed by single phase direct welding but, of course, the invention has the advantage of making a plurality of welds simultaneously. Furthermore we have found that the leads to the welding electrodes can be widely separated without appreciably affecting the welds. Thus the connection to the back-up bar can be arranged clear of the remaining apparatus whereby manipulation of workpieces is facilitated.

We claim:

1. Apparatus for effecting multiple resistance welds between two workpieces arranged in overlapping relation comprising a back-up bar of high electrical conductivity, two welding electrodes spaced from said bar, means for urging the electrodes towards said bar, and a three phase transformer, two secondary windings of said transformer being connected each to one electrode and the third secondary winding being connected to said back-up bar.

2. Apparatus for effecting multiple resistance welds between two workpieces arranged in overlapping relation comprising a back-up bar of high electrical conductivity, at least two welding electrodes spaced from said bar, means for urging the electrodes towards said bar, and a three phase transformer, two secondary windings of said transformer being connected each to one electrode connected in parallel to corresponding electrodes and the third secondary winding being connected to the back-up bar.

3. A method of effecting multiple welds by resistance welding, comprising the steps of arranging two workpieces in overlapping relation on a back-up bar of high electrical conductivity, bringing at least two welding electrodes into contact with the workpiece remote from the back-up bar at a welding position, connecting two secondary phases of a three-phase transformer to the electrodes and connecting the third secondary phase of said transformer to the back-up bar.

4. A method of effecting multiple resistance welds comprising the steps of arranging two workpieces in overlapping relation on a back-up bar of high electrical conductivity, urging a pair of welding electrodes by pneumatic means towards the back-up bar at a welding position, connecting two phases of a star-connected three-phase transformer to said pair of electrodes and connecting the third secondary phase of said transformer to said back-up bar.

References Cited in the file of this patent
FOREIGN PATENTS
397,139    Germany _____ June 26, 1924